(No Model.)

H. F. RIBLETT.
HOOF PARER.

No. 388,585. Patented Aug. 28, 1888.

WITNESSES:

INVENTOR:
H. F. Riblett
BY Munn & Co
ATTORNEYS.

UNITED STATES PATENT OFFICE.

HENRY FERNANDO RIBLETT, OF MANNINGTON, WEST VIRGINIA.

HOOF-PARER.

SPECIFICATION forming part of Letters Patent No. 388,585, dated August 28, 1888.

Application filed February 21, 1888. Serial No. 264,732. (No model.)

*To all whom it may concern:*

Be it known that I, HENRY FERNANDO RIBLETT, of Mannington, in the county of Marion and State of West Virginia, have invented a new and Improved Hoof-Parer, of which the following is a full, clear, and exact description.

This invention relates to tools for paring horses' hoofs, and has reference to that particular class of paring-tools constructed with pivoted arms, one of which has a buttress which rests against the horse's hoof and the other a paring-knife.

The invention has for its object to provide such a tool by means of which the paring may be evenly done and the tool be rendered durable. The invention is set forth in the following description and claim.

Reference is to be had to the accompanying drawings, forming a part of this specification, in which similar figures of reference indicate corresponding parts in all the views.

Figure 1:
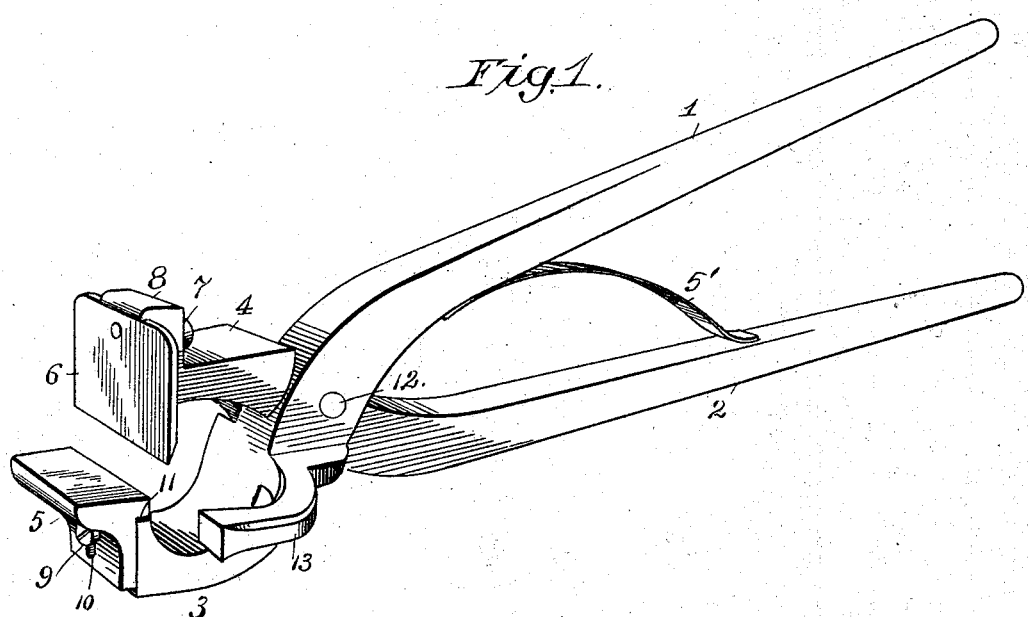
Figure 2:
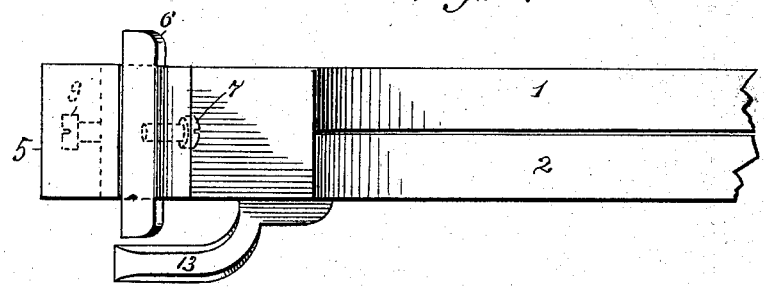
Figure 3:
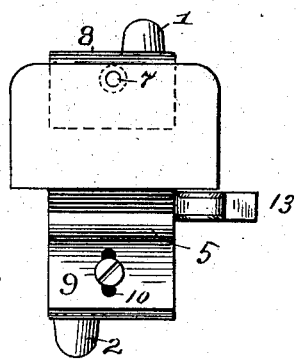

Figure 1 is a perspective view of the paring-tool. Fig. 2 is a side view thereof with the handles broken away, and Fig. 3 is an end view looking toward the operating parts.

In the construction of this invention the tool is formed with handles 1 2, pivoted together and having the curved end 3 with the buttress 5, and the curved end 4 with the paring blade or cutter 6, the ends 3 and 4 being curved in reverse directions. The blade 6 may be secured to the end 4 by means of a set-screw, 7, passing through a projection, 8, extending from the end 4, and the buttress 5 may be adjustably secured to the end 3 by means of a set-screw, 9, projecting through a slot, 10, therein and engaging the curved end 3. The buttress 5 is formed with a shoulder, 11, abutting against the end 3. The parts, instead of being separate, may be formed in one piece with the ends 3 and 4, but are preferably constructed as shown.

The handles 1 2 are provided with a reacting spring, 5', secured to the handle 2 and bearing against the handle 1. The end 3, adjacent to the pivotal point 12 of the handles 1 and 2, is formed with a curved projection, 13, which serves as a guide to the tool in the operation of paring.

In using the tool the buttress 5 rests against the rim or outer edge of the hoof, and is moved along as fast as each portion of the hoof is pared by the paring-knife 6. The projection 13 rests against the bottom of the hoof and bears against the pared portion to the left of the cutting edges, and serves as a gage to limit the depth of the cut and prevent the rim or margin of the hoof from entering too far between the knife and buttress. The projection serves also to steady the implement.

Having thus described my invention, I claim as new and desire to secure by Letters Patent—

A hoof-parer consisting in the pivoted handles 1 2, having reversely-curved ends 3 and 4, the former of which has a buttress on its outer end and a projection, 13, on its outer side extending outwardly and forwardly to a point approximately in line with the inner edge of the buttress, and the knife 6 on the front face of the end 4, substantially as set forth.

HENRY FERNANDO RIBLETT.

Witnesses:
FLEMING JOLLIFF,
A. G. HAWKINS.